Feb. 22, 1944.  R. DUSHANE  2,342,459
POWER SAW
Filed June 6, 1941  2 Sheets-Sheet 1

Inventor
Ray Dushane
By Lyon & Lyon
Attorneys

Feb. 22, 1944.　　　　R. DUSHANE　　　　2,342,459
POWER SAW
Filed June 6, 1941　　　　2 Sheets-Sheet 2
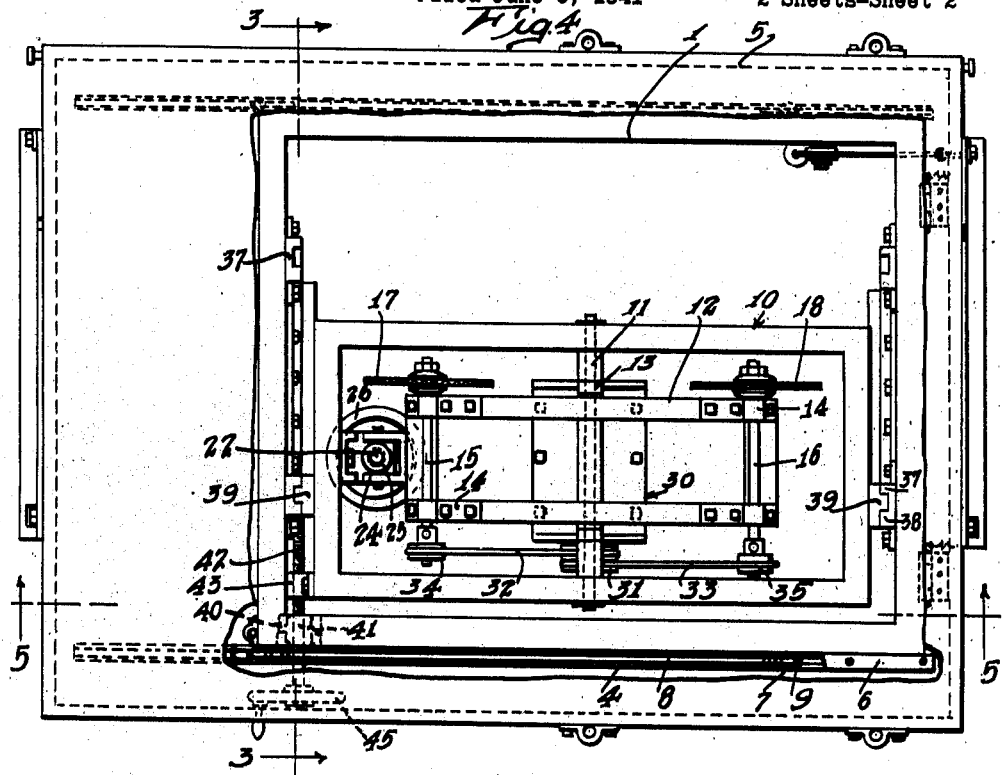
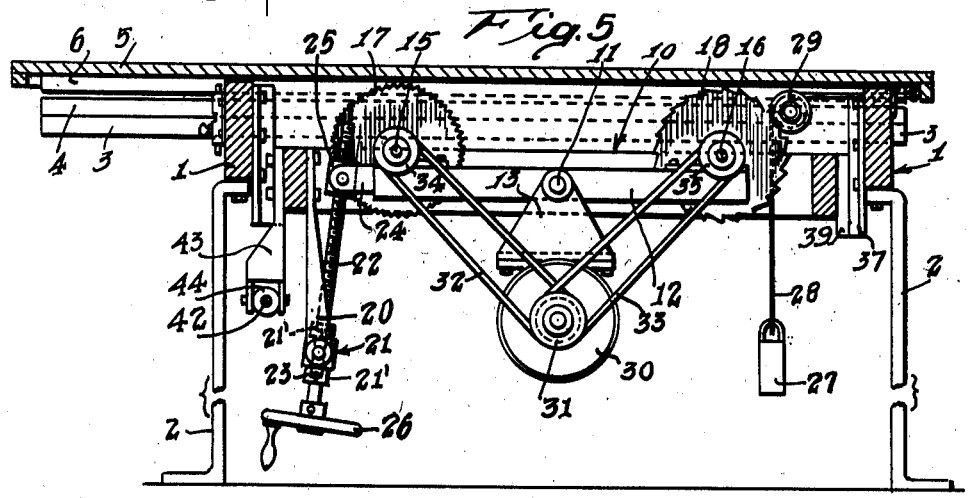
Inventor
Ray Dushane
By Lyon & Lyon
Attorneys Patented Feb. 22, 1944

2,342,459

UNITED STATES PATENT OFFICE 2,342,459

POWER SAW

Ray Dushane, Pasadena, Calif.

Application June 6, 1941, Serial No. 396,819

1 Claim. (Cl. 143—45)

My invention relates to a circular saw, and more particularly to a circular saw having interchangeable cross-cut and rip saws and means for tilting the arbor carrying the saws.

It has been usual in circular saws of the tilting arbor type to either position the motor in a stationary position, and when the arbor is tilted the belt drive between the motor and arbor is twisted, or when the motor is mounted to tilt with the arbor, both saws of a multiple saw are continuously driven and the power of the motor absorbed in the gears driving the two saws.

A saw constructed in accordance with my invention, carries the motor directly on the arbor tilt and has no twisting of the driving belts.

No gears are used to connect the saws and the motor of my saw, and by the novel positioning of my motor only the saw in actual use is driven by the motor.

It is therefore an object of my invention to provide a circular saw in which the saw arbors and motor are carried by the same tilting frame.

Another object of my invention is to provide a motor mount which permits automatic disengagement of the drive between the motor and the saw not in use.

Another object of my invention is to provide a simple, inexpensive and still accurate system of mounting saws and driving motor so that the same may be readily tilted as a unit.

Referring to the drawings:

Fig. 4 is a plan view with the table top broken in part.

Fig. 5 is a section taken on the line 5—5 of Fig. 4.

Figure 1:
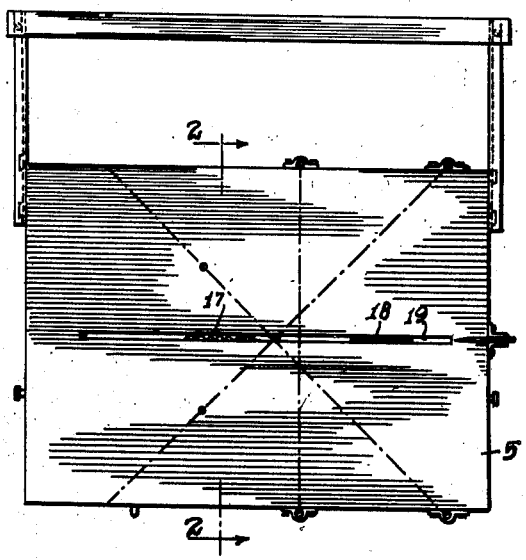
Fig. 1 is a plan view of my saw.
Figure 2:
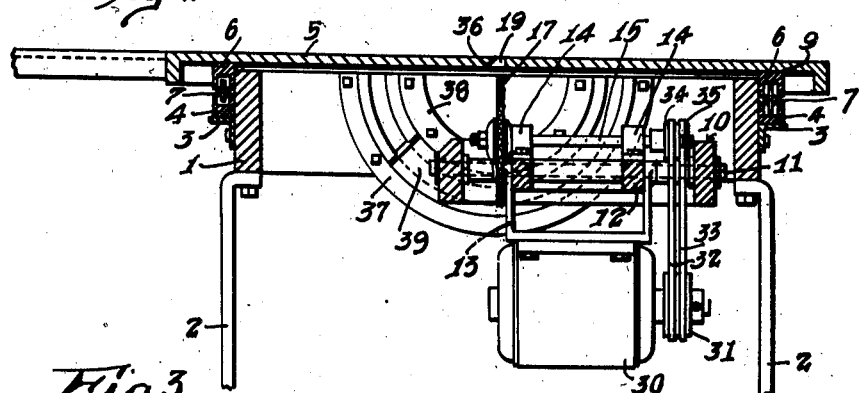
Fig. 2 is a section taken on the line 2—2 of Fig. 1.

A circular saw constructed in accordance with my invention, comprises a main frame 1 supported by legs 2.

As I prefer to use a sliding table top for greater ease in handling materials, I bolt the brackets 3 to both sides of the main frame 1 and fasten channels 4 to the brackets 3 to act as a ball bearing race. The channels 4 are parallel to one another. The table top 5 has channels 6 attached which cooperate with the channels 4 to complete the ball bearing race. Between the channels 4 and 6, and thus supporting the table top 5, are positioned the ball bearings 7. These ball bearings are spaced apart by a spacer bar 8 and prevented from further spacing by the straps 9. The table top 5 riding on the ball bearings 7 is easier to slide and more accurate than the usual system of sliding the material to be worked on the table. To return the table top 5 to its initial position I support the weight 27 by means of the cord 28 attached to the rear of the table top over the pulley 29 mounted on the main frame 1.

A tilting frame 10 is tiltably mounted within the main frame 1 below the table top 5, and carries a shaft 11 upon which is journaled the arbor frame 12 and the motor hanger 13. At each end of the arbor frame 12 are journals 14 for carrying the arbors 15 and 16. To the ends of the arbors 15 and 16 are bolted a cross-cut saw 17 and a rip saw 18 respectively.

The tilting frame 10 is mounted in the main frame 1 so that when the arbor frame is level the upper edges of both saws 17 and 18 do not extend above the upper surface of the table top 5.

To raise either of the saws 17 and 18 through the slot 19 and above the surface of the table, I provide the clevis 20 attached to one end of the tilting frame 10 and pivotally connected to a bearing 21 rotatively held in a fixed position between the collars 21' pinned to the threaded bolt 22 by the pins 23, and a clevis 24 fastened on the end of the arbor frame 12 to pivotally carry the nut 25 which threadably engages the bolt 22. When the hand wheel 26 is rotated the nut 25 travels up or down the bolt 22 and tilts the arbor frame 12. If the cross-cut saw 17 is the saw to be used, it is raised above the table top by turning the hand wheel 26 so that the nut 25 travels upwardly on the bolt 22 pivoting the arbor frame 12 around the shaft 11. By the reverse action of the hand wheel 26 the cross-cut saw 17 is lowered and the rip saw 18 raised into operating position.

A novel feature of my invention is the mounting of the motor 30 on the hanger 13 whereby tilting of the arbor frame 12 has no effect on the motor 30.

The shaft of the motor 30 carries the double pulley 31. The two sections of the pulley 31 are connected by separate belts 32 and 33 to the pulleys 34 and 35, respectively, mounted on the ends of the arbors 15 and 16 respectively. When the arbors' frame is tilted to raise the cross-cut saw 17 into operating position, the motor 30 does not tilt with the arbor frame but because of gravity tends to remain in its original position thereby tightening the belt 32 and driving the cross-cut saw 17. At the same time the belt 33 is sufficiently slacked to prevent any substantial amount of power being transmitted to the rip saw 18.

Figure 3:
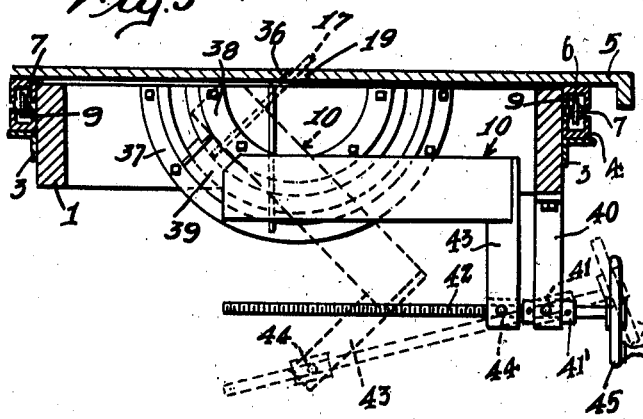
Fig. 3 is a section taken on the line 3—3 of Fig. 4, showing tilting mechanism only, the other parts being omitted for clarity.

Other tilting arbor saws with which I am familiar must have the slot 19 enlarged by the removal of an insert when the arbors are tilted to make an angle cut. By making the slot 19 on the under side of the table top 5 with a beveled slope 36, either saw 17 or 18 can be tilted as shown in Fig. 3. The correct position of the pivotal axis of the tilting frame 10 is where the plane of the saws 17 or 18 intersects the plane of the upper surface of the table top. This position permits the tilting of the saws 17 or 18 exactly at the table surface and removes the necessity of enlarging the slot 19 on the upper surface.

The tracks, comprising two spaced arcuate members 37 and 38 bolted to the main frame 1, support and guide the arcuate member 39 bolted to the tilting frame 10. The axis of curvature of the arcuate members 37 and 38 coincides with the aforementioned pivotal axis of the saws 17 and 18, and rotation of the tilting frame 10 on the arcuate members 37 and 38 will rotate the saws on this axis.

I provide a means for tilting the tilting frame 10 on its track and for maintaining the saws at the correct angle, which comprises a clevis 40 bolted to the main frame 1 and pivotally attached to the bearing 41 rotatively held in a fixed position between the collars 41' pinned on the threaded bolt 42, and a clevis 43 fastened on the tilting frame 10 to pivotally carry the nut 44 which threadably engages the bolt 42. Rotation of the hand wheel 45 will rotate the bolt 42, and by the movement of the nut 44 on the bolt 42, tilt the tilting frame.

While I have described preferred embodiments of my invention, it is understood that I do not wish to be limited to any of the details of construction except as described in the appended claim.

I claim:

In a circular saw, the combination of a main frame, a tilting frame, an arbor frame pivotally carried by said tilting frame, two arbors journaled at substantially the extremities of said arbor frame, cutters carried on said arbors, means for raising said cutters into operating position by tilting said arbor frame, a hanger pivotally mounted on said arbor frame substantially equidistant from said arbors, a motor mounted upon said hanger, a double pulley on the driving shaft of said motor, pulleys on both of said arbors, separate belts, connecting said double pulley and said arbor pulleys whereby raising one of said cutters causes said motor and hanger to pivot in relation to said arbor frame and tighten the belt from said double pulley to the arbor pulley of said raised pulley and to slacken the other of said belts.

RAY DUSHANE.